Patented Feb. 11, 1941

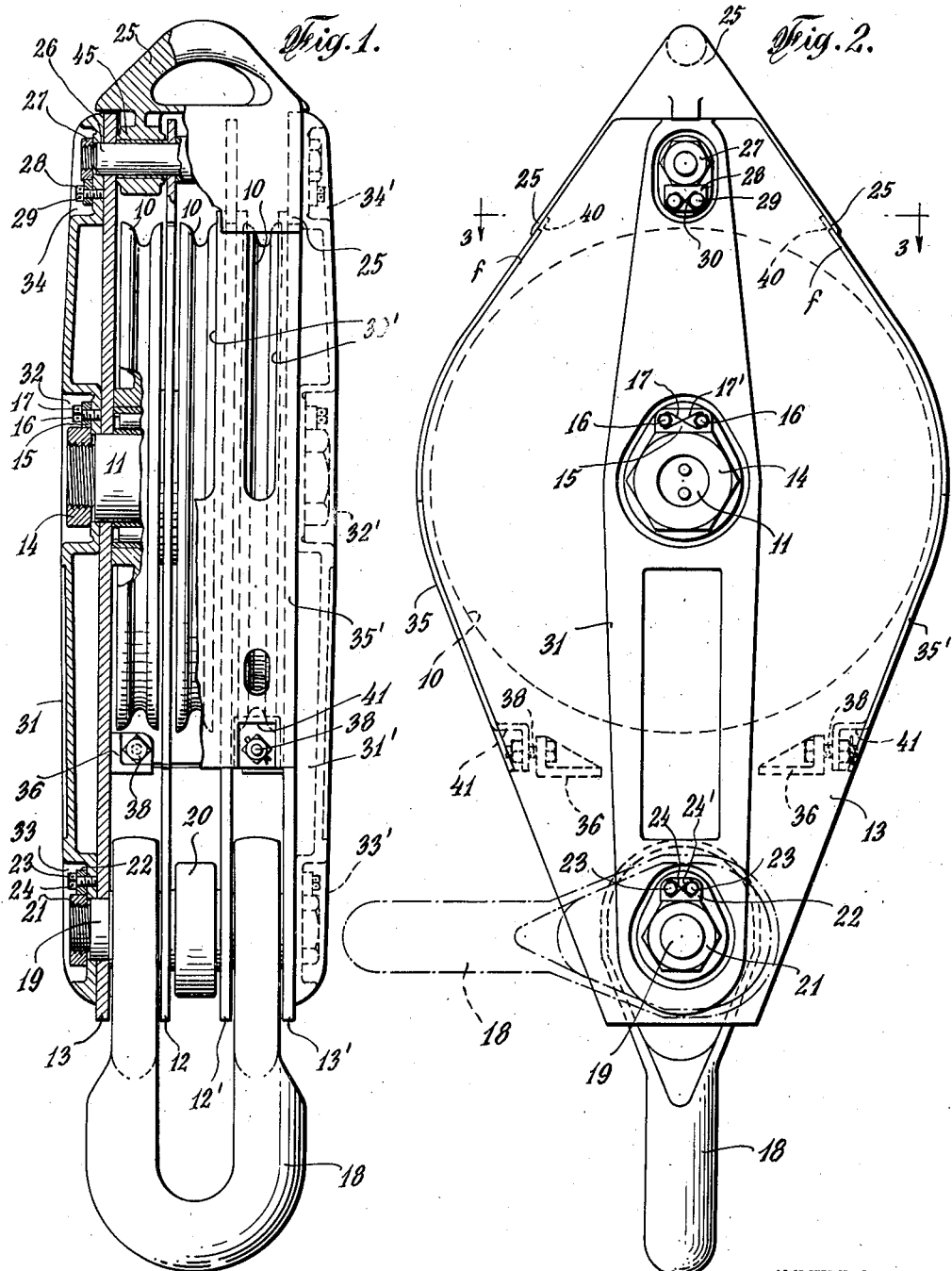

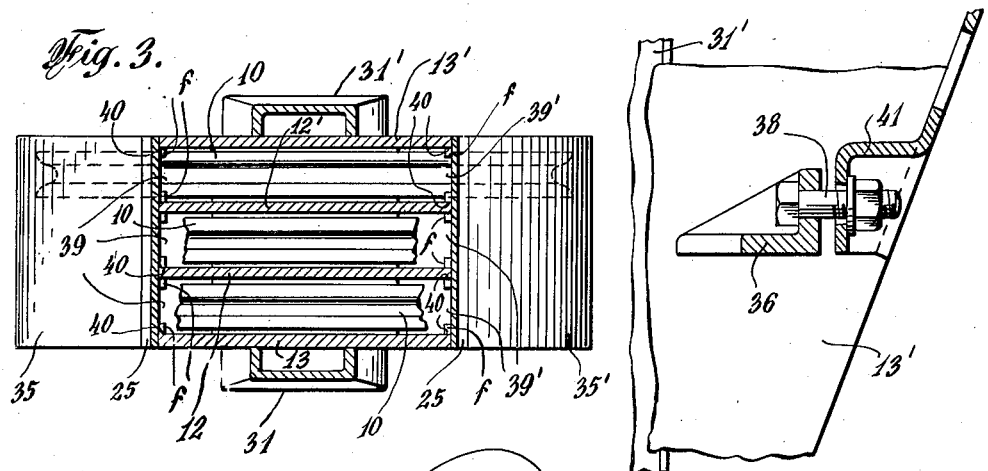
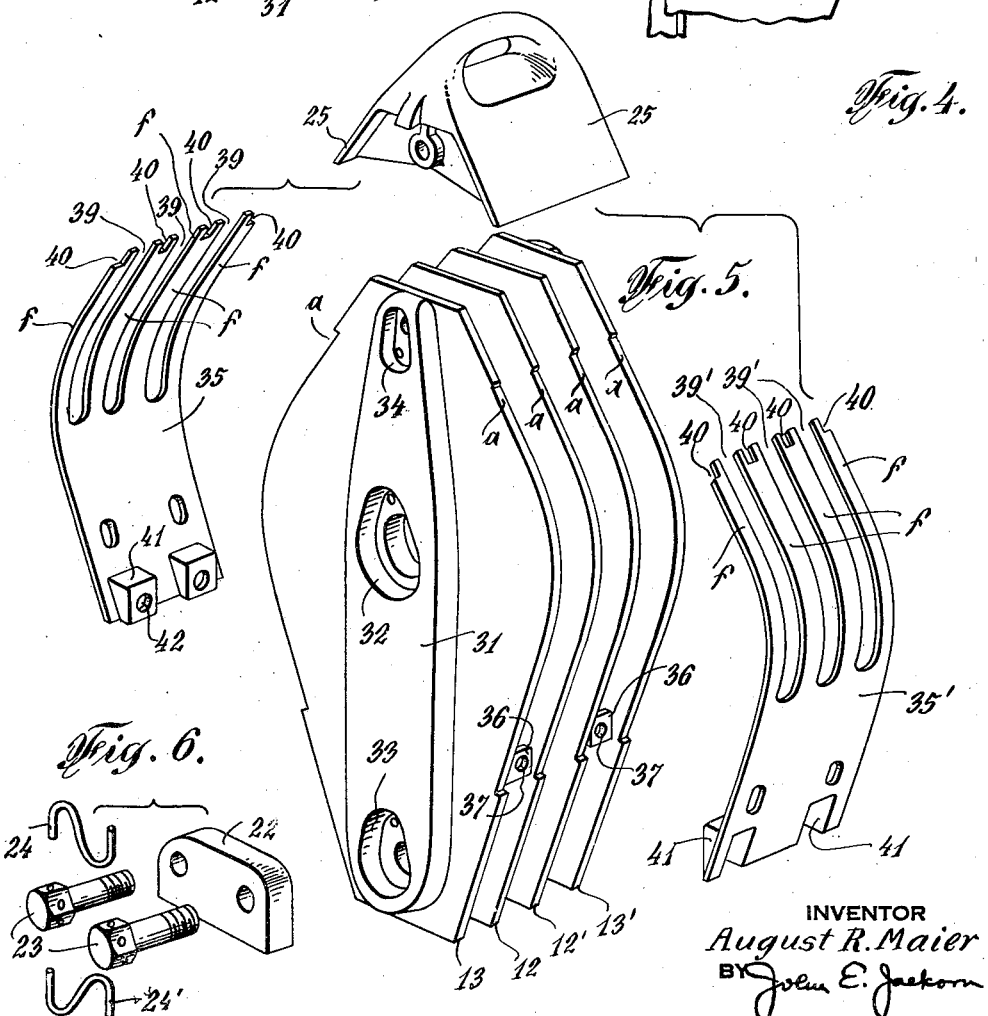

2,231,840

UNITED STATES PATENT OFFICE 2,231,840

TRAVELING BLOCK

August R. Maier, Dallas, Tex., assignor to Oil Well Supply Company, a corporation of New Jersey Application December 22, 1938, Serial No. 247,266

4 Claims. (Cl. 254—197)

This invention relates to traveling blocks for use in conjunction with hoisting apparatus, and more particularly to an improved assembly of elements including guard members comprising a traveling block. One of the objects of the invention is to provide a traveling block substantially free from protruding parts or sections which in service use would tend to entangle with associated apparatus. Another object is to provide a traveling block assembly including a guard therefor which will not require the removal of the guard to permit assembly of a rope within the block. Still another object is to provide an improved guard for a traveling block and means for attaching the same to the block. Other objects and advantages will be apparent as the invention is further disclosed.

Before further disclosure of the invention reference should be made to the accompanying drawings, wherein:

Fig. 1 is an elevational view partly in section of the improved traveling block of the present invention; Fig. 2 is a second elevational view of the same; Fig. 3 is a section along plane 3—3 of Fig. 2; Fig. 4 is an enlarged section illustrating one feature of the present invention; Fig. 5 is a perspective view illustrating the manner of assembly and attachment of the improved guard arrangement of the present invention to the traveling block; and Fig. 6 is a perspective view illustrating another feature of the present invention.

The improved traveling block of the present invent comprises a plurality of sheaves 10 rotatively mounted on center pin 11 with a plurality of body members including spacer plates 12—12' between the sheaves and side guards 13—13' covering the outer faces of the said sheaves 10, the sheaves 10, spacer plates 12—12' and side guards 13—13' being locked together in a unitary assembly by means of nut 14 on the end of center pin 11. A lock washer 15 is secured in locking relation to nut 14 by bolts 16 threaded into suitable openings in raised portion 31, with spring means 17—17' engaging the heads of the bolts 16 to insure against loosening of the bolts 16.

Clevis 18 is suspendingly supported on clevis pin 19 adjacent the bottom of spacer plates 12—12' and side guards 13—13' with spacer means 20 located between spacer plates 12—12'. Nut 21 on the end of clevis pin 19 is locked in position by lock washer 22 and bolts 23 engaging raised portion 31 and bolts 23 are locked by spring means 24—24' as heretofore described with respect to nut 14.

Hood 25 is secured in covering relation to spacer plates 12—12' and side guards 13—13' by means of hood pin 26 and nut 27 on the end of pin 26 is locked in position by lock washer 28, bolts 29 and spring means 30 in a manner similar to that heretofore described with respect to nuts 14 and 21. Spacer means 45 integral with hood 25 operates to maintain plates 12—12' and side guard members 13—13' in desired parallel spaced relation.

The outer face of each guard plate 13—13' is provided with a raised section 31 provided with appropriate recesses 32—32', 33—33' and 34—34' for the recession therein of bolts 14, 21 and 27 respectively in guard plate 13 and the heads of pins 11, 19 and 26 in guard plate 13'.

The longitudinal edges of the plates 12—12' and guards 13—13' are cut out intermediate the top and bottom ends thereof, providing edgewise recesses $a$ of a depth corresponding to the thickness of end guard members 35—35'. The contour of the members 12—12' and 13—13' includes central rounded portions concentric with and adapted to overlie and extend slightly beyond the circumference of the sheaves 10, and includes upper and lower extended portions secured by the respective pins 26 and 19 as described. Also, the contours of the recesses $a$ are preferably concentric with the sheaves 10 and lie slightly outwardly beyond said sheaves.

End guard members 35—35' are shaped in conformity with the contours of the said recesses and are adapted to lie over the plates 12—12' and guards 13—13' in the recesses $a$ to thereby enclose the sheaves 10 at the ends of the assembled block.

The upper portion of each guard member 35—35' is formed with spaced longitudinal slots 39—39' extending from the top edges of the guards 35—35' downwardly to a point slightly below the plane of the sheave pin 14, each slot having a width slightly less than that of the sheaves and each slot being centered or alined with the plane of a sheave to permit free passage of a rope or cable to the sheave through its associated slot.

The upper edges of the guards 35—35' are notched or cut out as at 40 in the finger portions $f$ between slots 39—39', said notches being in the planes of the spacer plates 12—12' and guards 13—13' for embracing interlocking engagement with said plates and guards beyond the upper terminals of the recesses $a$ when the lower edges of the guards 35—35' are in engagement with the lower terminals of the said recesses $a$.

For the purpose of securing the end guards 35—35' in the said interfitting relation with the plates 12—12' and side guards 13—13', I prefer to provide the hood 25 with oppositely depending end portions of sufficient length to overlie the interlocking engagement of the notches 40 of fingers f with the said plates and side guards, thus securing the upper ends of the guards 35—35' and the plates and side guards against displacement.

The side guards 13—13' are each provided with an apertured lug or projection 36 disposed slightly above the plane of the lower terminals of the recesses a, said lugs extending between said guards and the next adjacent plate 12 or 12'. End guard members 35—35' are each provided with a pair of inwardly offset portions 41 having openings 42 alined with the apertures of the lugs 36, whereby the lower ends of guards 35—35' may be secured in interlocked engagement with the plates 12—12' and guards 13—13' as by bolts 38.

The arrangement of elements comprising the improved traveling block of the present invention, as above described and as illustrated in the drawings, provides a block, the outer surface of which is substantially free from protruding nuts or bolt ends or of sharp edges and corners which interfere with the service use of the block. Moreover, the manner of attachment of the hood and the side and end guard members to the sheave is simple and effective to produce a strong unitary assembly from which the end guard members 35—35' may be readily detached and replaced with a minimum of time and effort.

It is apparent that many modifications and departures may be made in the present invention without departing essentially from the nature and scope thereof and all such modifications and adaptations are contemplated as may fall within the scope of the following claims:

What I claim is:

1. A traveling block including a plurality of sheaves and a plurality of body members separating said sheaves, said body members each having a recess in an edge thereof outwardly beyond the periphery of the sheaves, a guard member disposed in said recesses and having a plurality of rope slots therein in alinement with the respective sheaves, one end of the guard having spaced notches in the planes of the respective body members in interlocking engagement with said members, means overlying the said end of the guard and members for retaining the same in said interlocking engagement, and means adjacent the other end of the guard securing the latter to the body members.

2. A traveling block including a plurality of sheaves and spacer plates separating the sheaves, said spacer plates each having a recess in an edge thereof outwardly beyond the periphery of the sheaves, a guard member disposed in said recesses and having a plurality of rope slots therein in alinement with the respective sheaves, the upper edge of the guard having spaced notches in the planes of the respective spacer plates in interlocking engagement with said plates, a hood disposed above the plates and guard having a depending portion overlying the said edge of the guard and plates for retaining the same in interlocking engagement, and means adjacent the lower end of the guard securing the latter to the block.

3. A traveling block including a plurality of sheaves, side guards beyond the sheaves and spacer plates therebetween, said side guards and spacer plate each having recesses in opposite edges thereof outwardly beyond the periphery of the sheaves, oppositely disposed end guards in the corresponding recesses of the side guards and plates, said end guards having rope slots therein spaced in alinement with the respective sheaves, the upper edges of the end guards having spaced notches in the planes of the side guards and spacer plates in interlocking engagement with said guards and plates, a hood disposed above the side guards and plates having depending portions overlying the said edges of the end guards, side guards and plates for retaining the same in said interlocking engagement, lugs secured to the side guards adjacent the lower portions of and inwardly beyond the recesses in said guards, and means securing the lower ends of the end guards to said lugs.

4. A traveling block including a plurality of sheaves, guards on opposite sides of the series of sheaves and spacer plates therebetween, means centrally connecting said guards and plates and rotatably mounting the sheaves, means connecting the guards and plates at their upper ends and means connecting the same at their lower ends, said side guards and plates each having edgewise recesses in opposite edges thereof disposed outwardly beyond the periphery of the sheaves, oppositely disposed end guards positioned in the corresponding recesses of the side guards and plates, said end guards having rope slots therein spaced in alinement with the respective sheaves, the upper edges of the end guards having spaced notches in the planes of the side guards and plates for interlocking engagement therewith, a hood carried by the means connecting the side guards and plates at their upper ends, said hood having oppositely depending ends overlying the upper edges of the end guards, side guards and plates for retaining the same in said interlocking relation, lugs carried by the side guards adjacent the lower portions of and inwardly beyond the recesses in said guards, and means securing the lower ends of the end guards to said lugs.

AUGUST R. MAIER.